United States Patent [19]

Parker et al.

[11] Patent Number: 4,718,082

[45] Date of Patent: Jan. 5, 1988

[54] MODEM FOR EFFECTING FULL DUPLEX ASYNCHRONOUS/SYNCHRONOUS DIGITAL DATA COMMUNICATIONS OVER VOICE GRADE TELEPHONE LINK

[75] Inventors: Scott S. Parker, Melbourne; Timothy H. Scheffler, Indialantic; Paul W. Schirmer, Melbourne Beach, all of Fla.

[73] Assignee: Ark Electronics, Melbourne, Fla.

[21] Appl. No.: 777,450

[22] Filed: Sep. 18, 1985

[51] Int. Cl.$^4$ ............................................ H04M 11/00
[52] U.S. Cl. ...................................... 379/98; 379/355; 375/8
[58] Field of Search ................. 179/2 DP, 2 A, 2 CA; 375/8, 121; 379/93, 94, 96, 97, 98

[56] References Cited

U.S. PATENT DOCUMENTS

| | | | |
|---|---|---|---|
| 4,000,371 | 12/1976 | Ogawa | 179/2 DP |
| 4,215,243 | 7/1980 | Maxwell | 179/2 DP |
| 4,292,669 | 9/1981 | Wollum et al. | 364/200 |
| 4,425,664 | 1/1984 | Sherman et al. | 375/8 |
| 4,440,988 | 4/1984 | Heatherington | 179/2 C |
| 4,488,294 | 12/1984 | Christensen et al. | 370/84 |
| 4,494,194 | 1/1985 | Harris et al. | 364/200 |
| 4,520,452 | 5/1985 | Loskorn | 364/900 |
| 4,593,389 | 6/1986 | Wurzburg et al. | 370/110.1 |
| 4,607,379 | 8/1986 | Marshall, Jr. et al. | 375/121 |
| 4,633,489 | 12/1986 | Morishita | 375/121 |
| 4,635,275 | 1/1987 | Borg et al. | 379/93 X |

FOREIGN PATENT DOCUMENTS 2166024  4/1986  United Kingdom ................. 379/98

OTHER PUBLICATIONS

Backus Data Systems, pamphlet, Jun. 1985.

Primary Examiner—Gene Z. Rubinson
Assistant Examiner—Matthew E. Connors
Attorney, Agent, or Firm—Antonelli, Terry & Wands

[57] ABSTRACT

A modem for interfacing digital data communications between a data processing terminal and a telephone link contains, in the modem front panel, a control switch configuration for effecting automatic dialling of a previously stored telephone number, thereby enabling the automatic placement of a call for either an asynchronous or synchronous terminal which cannot perform modem command language. As an additional feature the modem of the present invention provides the capability of allowing an asynchronous terminal, using the command language of the modem via a first asynchronous interface, to place a call for either a synchronous terminal or an asynchronous terminal which cannot support the modem command language and, as a result, is connected to a second interface. The first interface is coupled to a modem control processor through which communication commands for the operation of the modem are effected. The second interface is coupled directly (thereby bypassing the control processor) to a modulator/demodulator or "data pump" for directly interfacing data between the telephone link and the device that is coupled to the second interface, which device, in effect, takes over control of the communication through that port.

38 Claims, 2 Drawing Figures

MODEM FOR EFFECTING FULL DUPLEX ASYNCHRONOUS/SYNCHRONOUS DIGITAL DATA COMMUNICATIONS OVER VOICE GRADE TELEPHONE LINK

FIELD OF THE INVENTION

The present invention relates in general to data communication systems and is particularly directed to an improved modem for carrying out full duplex digital data communications over a standard voice grade telephone link.

BACKGROUND OF THE INVENTION

Concomitant with the development and expansion of data/signal processing systems, including those in the distributed commercial data processing industry and the personal (home) computer market, has been the need for a communication medium that is readily accessible and which provides a communication capability that serves the needs of variety of equipments and users. By virtue of its presence throughout industrial, commercial and home environments and its capability of supporting digital data traffic, the standard telephone link is currently employed as the medium for meeting these multi-user/equipments communications requirements.

Interfacing digital data traffic between the telephone link and an end user's data processing equipment, which may be synchronous or asynchronous, is a modem which operates at some prescribed signalling rate (e.g. 300, 600, 1,200, 2,400 Baud). Because the digital processing/communication equipment to which the modem is to be coupled is often operated by a "non-technical" individual, the modem should ideally be simple to install and operate, perform consistently, and be flexible enough to meet the changing needs of the user, whether that user be a non-technical operator or a digital computer.

Because data communications are of one of two types (synchronous or asynchronous), modems have typically been configured to uniquely conform with the type of signalling format employed by the user's equipment. Asynchronous data communications have historically been carried out in a full duplex fashion over voice grade telephone lines at signalling rates of up to 1,200 Baud, by using an interface (e.g. RS 232C) which complied with the telephone company's communication standards (e.g. a Bell 103 (0–300 Baud) or Bell 212A (1,200 Baud) (interface). For manually controlled communications, such modems require the use of an attendant "dial-up" device in order for the communication (call) to be set up. Such an attendant device may include a standard telephone handset and control (talk/data) switches located on the modem, or a special purpose "data telephone" wherein the control switches are located on the telephone rather than on the modem. The placement of calls automatically has been accomplished via a suitable interface (e.g. an RS 366 interface (which is distinct from the above mentioned RS 232C interface)) to an automatic calling unit (e.g. a Bell 801 Autocall unit) which places the call for the modem without manual intervention.

In recent years modems that are compatible with the telephone company's equipment (e.g. a Bell 212A interface) have been introduced which allow an asynchronous device (e.g. user terminal) to control the modem and set up the communication (place the call) via an (RS 232C) interface between the intelligent equipment and the modem, using some prescribed asynchronous protocol (e.g. Hayes' "AT" protocol).

Synchronous communications have been historically accomplished in a half-duplex mode over voice grade two-wire telephone lines at signalling rates of 2,400 or 4,800 Baud using standard modems provided by the telephone company (e.g. Bell 208 units). For these units the call has been placed either manually (by always using an attendant handset) or automatically, by using, for example, a Bell 801-type autocall unit. Because of the specialized format/timing requirements of synchronous communications, there is at present no commonly accepted protocol that would permit a synchronous device to control a modem dialler via an asynchronous (RS 232C) interface.

Facing the diversification of users of data processing equipment and the wide variety of demands of data handling terminals, manufacturers have developed an assortment of modem types each of which is tailored to meet the needs of one or a few users, but none of which is presently adaptable to the broader spectrum of needs of both commercial and home users. For example, as mentioned above, modems employing Hayes' "AT" protocol have gained acceptance by the home/personal computer user for allowing an asynchronous terminal to control the modem, and the provision of external (front panel) control switches allow the user to control part of the operation of the modem (excluding auto-dial). Some modems employ manual dialing for setting up a call, while others offer a stored phone number directory with automatic dialing via a terminal formatted Hayes' "AT protocol" command. Some units offer a battery-powered back-up RAM for storing modem configuration parameters, or the use of an audio speaker to monitor the progress of a call. In order to effect a constant asynchronous terminal signalling rate regardless of telephone line speed there are also those modems which provide for the buffering of data within the modem. Finally, some units have adopted the use of a transparent industry-accepted (Micom Networking Protocol (MNP)) error detection protocol for asynchronous data. At present, however, there is no modem that offers to the user all of the above enumerated features or additional signalling capability that would substantially improve the flexibility of the modem and thereby enhance its application to effectively any digital data traffic communication environment.

SUMMARY OF THE INVENTION

In accordance with the present invention there is provided a new and improved modem that not only offers the features of conventional equipment described above, but is capable of added performance, thereby affording a degree of flexibility and adaptability to a number of different user needs not heretofore achieved.

Pursuant to the present invention, the modem is augmented by incorporating, in the front panel, a control switch configuration for effecting automatic dialling of a previously stored telephone number, thereby enabling the automatic placement of a call for either an asynchronous or synchronous terminal which cannot perform modem command language. As an additional feature the modem of the present invention provides the capability of allowing an asynchronous terminal, using the command language of the modem via a first asynchronous (RS 232C) interface, to place a call for either a synchronous terminal or an asynchronous terminal which cannot support the modem command language and, as a result, is connected to a second interface. The first interface is coupled to a modem control processor through which communication commands for the operation of the modem are effected. The second interface is coupled directly (thereby bypassing the control processor) to a modulator/demodulator or "data pump" for directly interfacing data between the telephone link and the device that is coupled to the second interface, which device, in effect, takes over control of the communication through that port.

DETAILED DESCRIPTION

Figure 1:
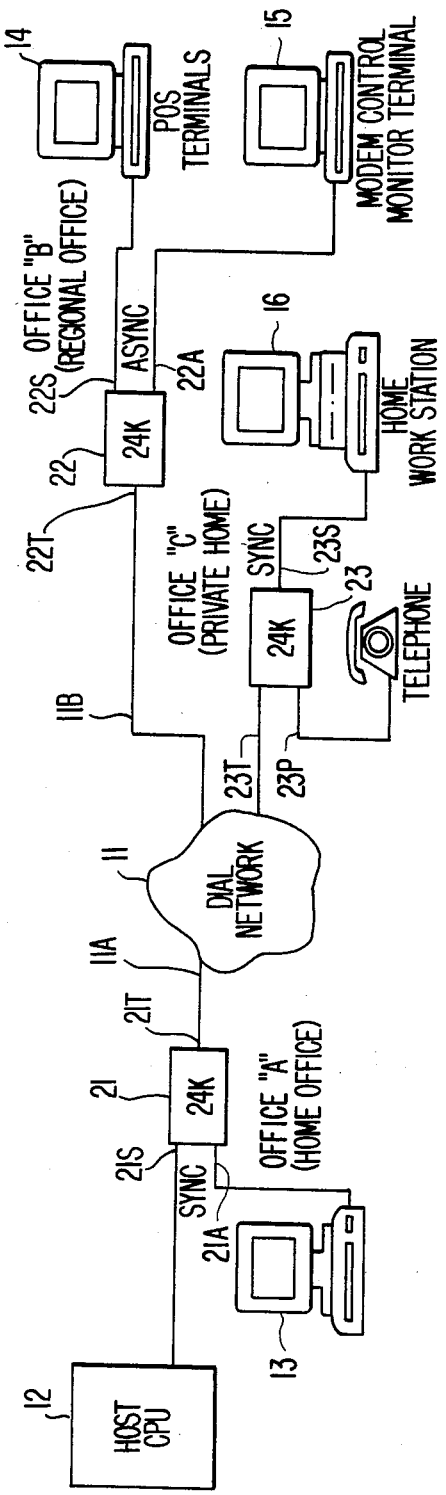
FIG. 1 is a schematic block diagram of an exemplary multiple user data communications network.

Before describing, in detail, the particular improved modem in accordance with the present invention, it should be observed that the present invention resides primarily in a novel structural combination of conventional communication/signal (data) processing circuits and not in the particular detailed configurations thereof. Accordingly, the structure, control and arrangement of these conventional components have been illustrated in the drawings by readily understandable block representations and schematic diagrams, which show only those specific details that are pertinent to the present invention, so as not to obscure the disclosure with structural details which will be readily apparent to those skilled in the art having the benefit of the description herein. In addition, various portions of a data communication network have been appropriately consolidated and simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention can be more readily understood.

Referring now to FIG. 1 there is shown an exemplary data communications telephone network in which the presen invention may be employed. The four-wire telephone communications medium is illustrated as a dial network 11 from which a number of subscriber lines 11A, 11B and 11C extend to respective end user terminal locations or "offices" A, B and C, whereat respective modems 21, 22 and 23 for interfacing the telephone links with terminal equipments are provided. Each modem, the details of which will be described below with reference to FIG. 2, has a first port or interface T coupled to a respective four-wire (dual two-wire) telephone link of network 11 for interfacing data to be transmitted over and received from the telephone link 11. As pointed out briefly above, each modem has the capability of carrying out both synchronous and asynchronous communications with respect to separate equipments. For this purpose each modem has a first asynchronous port or interface A which is coupled to a control processor within the modem, and a second dual synchronous/asynchronous port or interface S which is coupled to both the modem's internal control processor and directly to a modulator/demodulator unit ("data pump") for providing the capability of directly interfacing a local controlling synchronous device (e.g. a host computer) with the telephone link, thereby bypassing the normal communications control function of the internal processor.

In the exemplary telephone communications network shown in FIG. 1, the asynchronous port 21A of modem 21 is coupled to a computer terminal 13, (such as a desk-top control/command computer at a central business office), while the synchronous port 21S is coupled to a host processing unit, such as a processor in the business office, controlling one or more remote point-of-sales terminals (e.g. POS-terminal 14 at regional office B) via a synchronous data channel. Modem 21 is coupled to telephone link 11A via its full duplex (four-wire) port 21T. Also shown in FIG. 1 is a modem 22, which may be located in a "regional" office B for the business of interest, remote with respect to office A, office B containing one or more terminals with which the "home" office A may communicate. Modem 22 has a full-duplex telephone port 22T coupled to link 11B of network 11 and respective synchronous and asynchronous ports 22S, 22A coupled to a monitor terminal 15 and point-of-sales terminal 14, referenced above.

In addition to the "home" office A and the "regional" office B, FIG. 1 shows a third, relatively remote, terminal site C which, for purposes of the present example, may be a private home, whereat a homework station 16 is located. For interfacing the terminal of work station 16 to the telephone network, modem 23 has its synchronous port 23S coupled to the RS 232C interface line of terminal 16 and its telephone network port 23T coupled to network link 11C and a port 23P to an attendant handset 24. Handset 24 may be used to set up the call, after which communications between terminal 16 and the called terminal are carried out synchronously under the control of terminal 16.

For the exemplary network configuration of FIG. 1, it should be observed that the port connections, types of equipment and number of stations and devices are not limited to those shown. The network illustrated is merely intended as an example for purposes of facilitating an appreciation of the variety of equipments/users to which the modem of the present invention may be applied.

Figure 2:
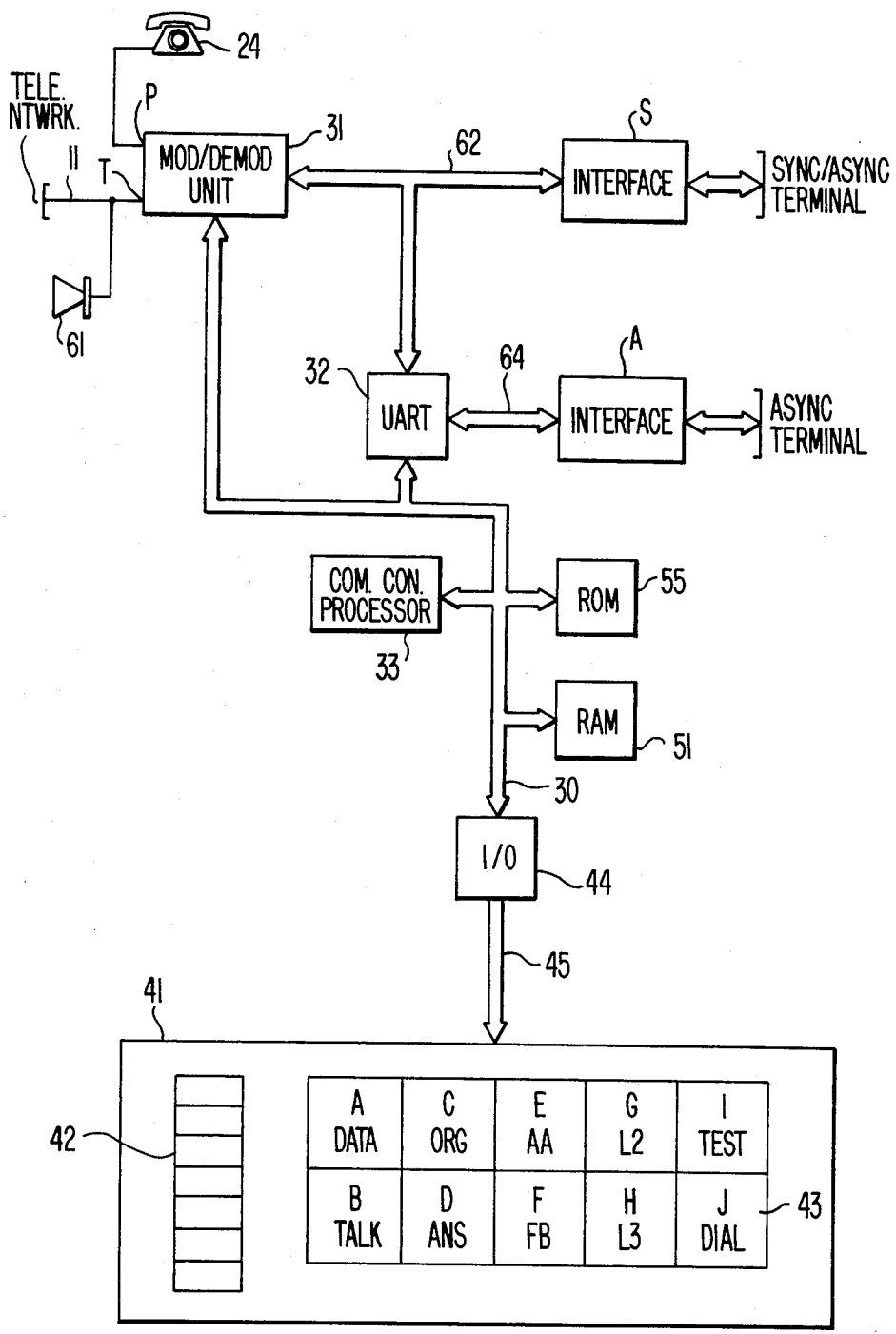
FIG. 2 is a schematic block diagram of the dual interface modem employed in the network of FIG. 1.

Referring now to FIG. 2, there is shown a diagrammatic illustration of the components and interconnections of those components contained within the modem of the present invention which may be employed as any one of the modem units 21, 22, 23 in the signal processing/communications network shown in FIG. 1, described above. As mentioned previously, each modem includes a pair of interfaces or ports S, A for coupling digital data signals with respect to associated terminal equipment(s). Interface S is capable of coupling either a synchronous or an asynchronous serial data stream with respect to a local processing terminal and port T which is coupled to the telephone network. For synchronous data communications, port S is coupled over link 62 to a modulator/demodulator unit 31 which receives the serial data stream from an attendant terminal and modulates that data stream onto a carrier for transmission over the telephone link. Conversely, the modulator/demodulator unit demodulates incoming data traffic from the carrier received over link 11 and couples it to the link 62. As pointed out previously, modulator/demodulator unit 31 is, in effect, what is termed in the art a "data pump" and may comprise an R2424 modem chip set manufactured by Rockwell Corporation. Modulator/demodulator unit 31 has multiple modulation capability for handling different modulation and signalling formats (e.g. QAM, FSK modulation, pulse-/tone signalling) and different Baud rates (e.g. 300, 600, 1,200, 2,400). Unit 31 is selectively enabled under the control of communication control processor 33, via intra-modem communications bus 30, for handling the intercoupling of data between telephone link 11 and one of digital interfaces A, S, as will be described in detail below. For more details as to the configuration of operation of modulator/demodulator unit 31 attention may be directed to the R2424 modem chip set itself and accompanying operation/instruction manuals supplied by Rockwell Corporation. Modulator/demodulator unit 31 has an additional port P, which may be coupled to a local telephone handset 24, for receiving (via dial pulses/tones) the identification of the called party, in response to which unit 31 will assemble an original transmission message, for setting up the call between an attendant synchronous device, which is coupled to port S, and the called terminal via telephone link 11. Also coupled to port T (and telephone link 11) is a speaker 61 to permit the end user to audibly monitor the communication.

Link 62, which, as described above, couples either synchronous or asynchronous digital data signals to and from modulator/demodulator unit 31 and an attendant (terminal) device coupled to port S, is also coupled to an internal dual channel serial interface unit 32. Serial interface unit 32 may comprise a universal asynchronous receive/transmit unit (UART), such as a Zilog SIO dual channel serial interface chip, for interfacing asynchronous communications, under the control of communications control processor 33, between the modulator/demodulator unit 31 and asynchronous port A, which is coupled to serial interface unit 32 via link 64. Communications control processor 33 may comprise a Zilog Z80 microprocessor and serves to control each of the active components within the modem via a distributed bus architecture employing intra-modem bus 30, having customary address, data and control lines for communicating with processor 33. Through intra-modem communications bus 30, processor 33 continuously and sequentially addresses (scans) each of the units that are connected to the bus for status, input/output read/write requests, etc. as conventionally executed in a distributed communication network.

Distributed along bus 30 and thereby coupled to microprocessor 33 are the serial interface unit 32, modulator/demodulator unit 31, local memories 51 and 55, and an input/output (encode decode) unit 44 through which the operation of the modem may be externally controlled and displayed. Memory 55 may comprise a read only memory (ROM) for storing the firmware for the communication controlling operation of microprocessor 33; i.e., in effect, memory 55 contains a stored communications program for controlling the operation of the modem. Memory 51 is a battery powered random access memory of substantially lesser capacity than stored program memory 55, but which capacity is sufficient to store a phone directory and all operational modem parameters required for the intended functionality of the system. Memory 51 provides a safety backup in the event of a power outage, whereby the modem may immediately come back on line without the need for reconfiguration and without the loss of critical operational data. Rather than itemize the individual instructions of a specific communications program that may be stored in memories 51 and 55 and employed by processor 33 to control the operation of the modem, a level of detail that is unnecessary for an understanding of the present invention, the description below will set forth the operations of the components of which the modem is comprised and the manner in which these components interface with one another during both synchronous and asynchronous communications.

Also diagrammatically illustrated in FIG. 2 is a front panel 41 which contains a set of input/output devices consisting of function indicator lights 42 and external control switches 43. The respective lines for indicator lights 42 and control switches 43 are coupled via link 45 to an input/output (encode/decode) unit 44 which is coupled to bus 30. Through input/output unit 44 processor 33 accesses the front panel for reading the states of the control switches 43 and providing operational status of the modem to bus 30. Through input/output unit 44 processor 33 accesses the front panel for reading the states of the control switches 43 and providing operational status of the modem to the user, by way of indicator lights 42. In effect, lights 42 indicate the operation of modulator/demodulator 31, through which calls and data traffic between the telephone line and an associated user terminal are carried out. For this purpose lights 42 may indicate power status (ON/OFF), transmit, receive, data terminal ready, data set ready, carrier detect, clear-to-send, request-to-send, ring signal detection, and test mode error.

Just as the front panel indicator lights 42 function as operational status devices indicating to the user the state of operation of the modem, control switches 43 provide the user with a facility for selectively controlling prescribed operations of the modem. Pursuant to one aspect of the invention, switches 43 enable the user to instruct the modem to access and automatically call a directory number that has been previously stored under the control of an attendant asynchronous terminal connected to one of ports A and S. The manner in which the directory numbers are stored and accessed will be explained below in conjunction with the description of the operation of the modem. For purposes of the present description, it is to be understood that control switches provide the user with the ability to selectively set operational states into which the modem to be placed. Except for the TEST and DIAL functions, enumerated below, the remainder of the control functions available through switches 43 include those customarily provided by a variety of modem manufacturers, so that no detailed description of their operation, which is not necessary for an understanding of the present invention, will be provided here. Instead a general description of each of these switches and their customary use for external front panel control will be provided.

Each control switch may comprise a simple two-position (binary) electrical switch for selectively presenting one of two voltage levels (e.g. +5 volts and ground) over link 45 to unit 44 (e.g. a "1" for position-one, "0" for position-two). As noted above, the status of each switch is coupled via link 45 to respective status registers within input/output unit 44, through which control processor 33 reads input commands from the front panel 41. In accordance with preferred embodiment of the invention, front panel 41 may contain ten switches as diagrammatically illustrated in FIG. 2, the respective functions of which are as follows.

Data (A)—The DATA switch is used to command the modem to switch from the TALK (command) mode to the DATA (on-line) mode. The DATA switch may contain an internal light emitting diode which is energized to indicate that the modem is in the DATA (on-line) mode. The (A) on the DATA switch represents a first directory entry, or entry "A". Directory entry "A" corresponds to a directory entry in memory 51 which the modem accesses in response to activation of the DIAL switch (to be discussed below) and the DATA switch A after depression of the DIAL switch.

TALK (B)—The TALK switch is employed to command the modem to switch from the DATA (online) mode to the TALK (command) mode. An internal light (LED) associated with the TALK switch may be used to indicate that the modem is in the TALK (command) mode. The TALK switch (B) is also used to access a second directory entry identified as directory entry "B". When depressed after the DIAL switch, the TALK switch commands the modem to dial directory entry B.

ORG (C)—The ORG switch is used to instruct the modem to switch from the ANSWER mode to the ORIGINATE mode. This switch may also contain an internal light emitting diode to indicate that the modem is in the ORIGINATE mode. The switch is also used to access a third directory entry "C", when depressed after the DIAL switch.

ANS (D)—The switch is used to command the modem to switch from the ORIGINATE mode to the ANSWER mode. A light emitting diode may be associated with the ANS switch to indicate that the modem is in the ANSWER mode. When depressed after the DIAL switch, the ANS (D) switch commands the modem to dial a directory entry stored as directory entry "D".

AA (E)—The AA switch commands the modem to go into an AUTO-ANSWER mode. The (E) indication on the AA switch represents a fifth directory entry which may be accessed subsequent to depressing the DIAL switch.

FB (F)—the FB switch is used to place the modem in a "forced busy" condition and causes the modem to connect to the telephone line (go OFF-HOOK), thereby forcing the telephone line connected to the modem to go "busy". The "F" on the switch indicates a sixth directory entry that may be accessed from the front panel by the user;

L2(G), L3(H)—The L2 and L3 switches are employed to instruct the modem to perform remote digital and remote analog loop backs, respectively. The "G" and "H" designations represent seventh and eighth respective directory numbers which may be access subsequent to depressing the DIAL switch.

TEST (I)—The switch is used to command the modulator/demodulator unit 31 to perform an internal self-test function. As noted above, in accordance with a preferred embodiment of the invention, modulator/demodulator unit 31 is comprised of a Rockwell R2424 chip set. As one of the features of this chip set is its ability to perform a self-test of its operational capability through a simple external command, a switch for that purpose (TEST) is incorporated as part of the front panel 41.

DIAL (J)—The DIAL switch is used to command the modem to go into the AUTO-DIAL mode. Specifically, this switch commands the modem to dial one of the directory entries stored in memory 55. As pointed out previously, in accordance with one feature of the invention, automatic dialing of a directory number may be effected by use of the front panel. The number to be dialed is previously stored in memory 55 (through the use of an asynchronous terminal, as will be explained below). In order to automatically dial a previously loaded directory number, the operator depresses the DIAL switch, and then depresses one of the switches A-J. As explained above, the indications A-J respectively correspond to one of ten directory entries that may be automatically dialed by the modem in response to the depression of the appropriate switch by the operator. The manner in which the directory entries are loaded into memory and accessed by the modem for setting up a call will be explained below in connection with the description of the operation of the modem.

Depending upon the type of data/signal processing equipment to which the modem is connected, the communication to be carried out over the telephone link 11 may be either synchronous or asynchronous. As described above, asynchronous communications may be effected through either of the interfaces S or A, links 62 and 64 for which couple these interfaces to a dual channel serial interface unit 32 which, together with modulator/demodulator unit 31 (under the control of communications processor 33), assembles the digital data traffic to be coupled over the telephone link 11 and disassembles incoming data traffic on link 11 for delivery to the attendant terminal by way of one of the links 62 and 64. For synchronous communications, dual channel interface unit 32 is bypassed, since control of the communication is controlled directly from the attendant terminal. Namely, the attendant terminal is coupled by way of synchronous port S through link 62 directly to the modulator/demodulator unit 31.

In the network configuration shown in FIG. 1, discussed briefly above, for the host central processing unit 12 at a home office A, a synchronous communication link may be established between the host CPU 12 and a remote device at another site. Thus, host CPU 12 is coupled to a port 21S of modem 21 for a direct link to its internal modulator/demodulator unit 31 and accessed to the telephone link 11. Another terminal 13 such as a personal computer/CRT display/keyboard, typically requires an asynchronous RS 232C interface and is coupled to port 21A. Messages to and from terminal 13 are to be controlled by the dual channel interface unit 32 under control of microprocessor 33, since the communication is an asynchronous communication.

At the regional office B, a terminal, such as point-of-sales terminal 14, which is under the control of the host CPU 12 at the home office A, is coupled by way of synchronous communication port S, via link 62, to the internal modulator/demodulator unit 31 of modem 22. Monitor terminal 15, on the other hand, may respond to communications terminal 13 at the home office A and is coupled to the asynchronous port 22A of modem 22.

Finally, at the third terminal site (private home) C, there may be provided a work station 16 which is driven remotely by host CPU 12 at the home office A. In this circumstance, the work station carries out synchronous communications under the control of the host CPU 12 by way of port 23S. Setting up of the call between the work station and the host CPU 12 may be conducted by a handset 24 which is coupled to port P of the modulator/demodulator unit 31. For conducting asynchronous communications relative to a personal computer provided at the private home site C, the asynchronous port 23A of modem 23 would be coupled to the terminal. For a full appreciation of the operation of the modem for these and other network/site configurations, the respective asynchronous and synchronous modes of operation of the modem will be described individually below.

Asynchronous Mode

As pointed out above, for conducting asynchronous communications, either of interfaces S or A may be accessed by an attendant terminal. For purposes of the present description, it will be assumed that the attendant terminal comprises a present day personal computer, including CRT display and attendant keyboard. To initiate the communication, the user types in a dial command, via the keyboard, followed by the telephone number of the party with whom the communication is to take place. From the attendant terminal, serial data stream encoded with the dial command and the telephone number of the remote party is coupled via the asynchronous interface A and coupled over link 64 to the dual channel serial input/output unit 32. As the digital data stream is coupled to unit 32, it is being continuously monitored via bus 30 b the communications control processor 33 for the presence of commands. To provide a window for command detection, as the data is received by unit 32, it is temporarily buffered and examined by the processor 33 before being forwarded to the modulator/demodulator unit 31. Processor 33 recognizes the dial command portion of the digital data sequence coupled from the ásynchronous terminal and, in response to that dial command, executes the stored program for instructing the modulator/demodulator unit 31 to dial the digits (either as tones or pulses) of the number supplied from the asynchronous terminal.

The modulator/demodulator unit 31 sends the dialed number out over the telephone link 11 to the called party and waits for an answer. In response to detecting an off-hook condition at the remote end of the link, unit 31 sets a flag, which is read by the microprocessor 33 over bus 30, to indicate to the modem that a communication link with the called party has been established. An indication of the establishment of the call is also coupled via the unit 32 and link 64 to the asynchronous interface A for presenting via the display screen of the associated terminal an indication that the call connection has been completed. The user now proceeds to communicate with the remote party by way of his terminal keyboard.

As noted above, as the incoming terminal data stream is being coupled to the asynchronous interface A, it is "windowed" or temporarily buffered and examined by the control processor 33 before being coupled via the interface unit 32 and link 62 to the modulator/demodulator unit 31 for transmission over link 11. For the most part, the data is simply routed by way of the dual channel input/output unit 32 as it is received from the asynchronous interface A, for coupling to the modulator/demodulator unit 31 and transmission over the telephone link. It is continuously monitored, however, for the presence of a command in response to which processor 33 would take action. For example, at the termination of the communication, processor 33 would see a command character (commonly termed an escape sequence) indicating a termination of the communication. In response to this command, the communications control software stored in memory 55 is employed by processor 33 to instruct the modulator/demodulator unit 31 to go back on-hook, whereby the carrier on telephone link 11 disappears. At the other end of the link, the remote terminal sees a loss of carrier and is thereby instructed that the communication has come to and end.

Synchronous Mode

As pointed out previously, because there is no standard protocol for synchronous communications, in this mode of operation the modem simply acts as a data pipe between the attendant synchronous terminal and the telephone line. All synchronous communications must therefore be connected through the synchronous interface S, which is coupled directly through link 62 to the modulator/demodulator unit 31. Because the synchronous data stream cannot be used to provide commands to the modem, the establishment of the communication channel to the called party must be carried out exclusively of the synchronous interface. This may be accomplished either through the use of a local handset 24 which the user employs to dial the number of the called party and, once the communication link has been established, the user simply begins to transmit data over the synchronous link. For this purpose, the internal circuitry of the modulator/demodulator unit 31 provides a direct connection path an external handset 24 and the telephone link 11. Once the number has been dialed by the user via the handset 24 and the dialed party has answered, link 11 is then ready to interface data with the synchronous port by way of modulator/demodulator unit 31 and link 62.

Obviously, the establishment of a call through the conventional use of a local handset, while an option of the modem of the present invention, is time consuming and involves the use of additional external equipment. In accordance with one of the features of the present invention, control switches provided in the front panel 41 may be employed to instruct the modem to dial a previously stored number, without the need for other external equipments, such as the handset 24, discussed above.

For this purpose, the user depresses the dial switch (J) on the front panel and thereafter depresses one of the switches (A) . . . (J) that is associated with the directory number of interest. During its normal sequential scanning of the various units that are connected to intra-modem bus 30, processor 33 will have scanned the switch status buffers in input/output unit 44 and will have recognized the depression of switch J as an automatic dial request. Thereafter processor 33 will examine switch statu buffers in input/output unit 44 to identify which directory number has been requested by the depression of a corresponding switch of front panel 41. That switch identification is then used to access the previously stored directory number from memory 51. The directory number is fetched from the memory 51 and coupled to the modulator/demodulator unit 31. Unit 31 then dials the number (by pulse/tone signalling) to establish the communication channel over link 11 to the remote party. When unit 31 detects the completion of a data channel, it provides an indication to the appropriate visual indicator 42, so that the user may begin the transmission of synchronous data to interface S, through link 62 and unit 31 to the telephone link.

Data is then exchanged over link 11 through the modulator/demodulator unit 31 and the synchronous port S to the attendant synchronous terminal. At the end of the communication, the user presses the TALK switch, to provide an indication to the processor 33 that the communication is to be terminated. When next reading the state of that control switch status buffer within input/output unit 44 associated with the TALK control switch (B), processor 33 will note that the communication is to terminate and will so advise the modulator/demodulator unit 31.

As pointed out above, automatic dialing of a directory number by way of the control switches on the front panel 41 of the modem requires that the directory number, which is associated with a respective one of the control switches, be previously stored in RAM 51. For this purpose, an asynchronous terminal, coupled to either of interfaces S or A may be employed to instruct the processor 33 to store a number of interest. Namely, the user employs his terminal keyboard with an appropriate storage command followed by the directory number. The storage command includes the identification of the switch on the front panel, so that the corresponding address of the location in memory 51 associated with the switch position may store a digital code corresponding to that directory number.

For the front panel switch configuration described above, in which ten different functional switches are employed, up to ten directory numbers may be selected. It should be understood, however, that the number of functional switches, their respective functional applications, or the directory total, is not limited to those described herein. As noted previously, except for the TEST and DIAL switch functions, the other functional switches have been employed in various combinations in a number of commercial modem front panel configurations. What is offered by the present invention is the incorporation of an additional functional switch, DIAL (J), through which the user may instruct the modem to automatically dial a previously stored number, thereby expanding the flexibility of the modem and considerably simplifying its operation for synchronous communications. Moreover, while the command set through which the automatic dial function is implemented has been described as the use of a DIAL command, followed by the selection of a particular dialed number using either the DIAL (J) command switch or another one of the front panel switches, it should be observed that other switch configurations for accessing previously stored numbers may be employed. Namely, a separate set of switches each selectively assigned to store directory numbers, completely apart from the ten functional command switches, may be employed. However, such a switch configuration adds additional hardware to the front panel and an additional interface unit for the intra-modem bus 30. In accordance with a preferred embodiment of the invention, multiple use may be made of the front panel control switches by a fairly simple firmware command set in accordance with which the processor responds to a DIAL command by reading the switch buffer register in input/output unit 44 to identify the address (control switch equivalent) of the directory number stored in memory 51.

As will be appreciated from the foregoing description, the modem of the present invention offers the digital communications equipment user a multi application interface unit that serves to provide both synchronous and asynchronous communication capability. Moreover, while an attendant handset may be employed with the modem for the establishment of a call, such a handset may be dispensed with and the calls effected directly either through the use of the front panel or by way of the attendant asynchronous terminal. The flexibility offered by the dual synchronous/asynchronous interface and front panel auto dial configuration effectively makes the modem of the present invention a universal interface unit meeting substantially all present day digital communication/telephone link requirements.

While we have shown and described an embodiment in accordance with the present invention, it is understood that the same is not limited thereto but is susceptible of numerous changes and modifications as known to a person skilled in the art, and we therefore do not wish to be limited to the details shown and described herein but intend to cover all such changes and modifications as are obvious to one of ordinary skill in the art.

What is claimed is:

1. For use in a data communications network wherein messages originating from or intended for delivery to a data handling device are transmitted over a communications link, an apparatus for carrying out the transmission and reception of said messages comprising:

a first data communications port adapted to be coupled to said communications link;

second and third data communications ports, each of which is adapted to be coupled to a respective data handling device and is capable of interfacing asynchronous data communication signals;

a modulator/demodulator unit, coupled to said first and second data communications ports, for transmitting synchronous data communication signals that are coupled to said second port from a data handling device over said communications link via said first data communications port, and for receiving synchronous data communication signals that are received from said data communications link at said first data communications port and coupling said synchronous data communications signals to said second port for delivery to a data handling device coupled thereto; and a communications control unit, coupled to each of said second and third ports and to said modulator/demodulator unit, for controlling the transmission by said modulator/demodulator unit, via said first port to said communications link, of asynchronous data communication signals that are coupled to either of said second and third ports by a data handling device, and for controlling the delivery of asynchronous data communication signals, received from said communications link at said first port by said modulator/demodulator unit, to a data handling device coupled to one of said second and third ports.

2. An apparatus according to claim 1, wherein said communications control unit includes means for storing a plurality of codes, each of which is associated with the address of a respective data handling device with which data communications may be conducted via said communications link, and wherein said apparatus further includes control switch means, coupled to said control unit, for causing said control unit to control said modulator/demodulator unit to establish a data communications channel over said communications link to a data handling device, the address of which corresponds to one of said plurality of codes, whereby synchronous data communication signals from a data handling device coupled to said second port may be transmitted by said modulator/demodulator unit over said channel to said addressed data handling device.

3. An apparatus according to claim 1, wherein said apparatus further includes control switch means, coupled to said control unit, for coupling prescribed communication controlling signals to said control unit and thereby control the operation of said apparatus in the course of a communication between a data handling device and a remote device coupled to said communication link.

4. An apparatus according to claim 3, wherein said communications control unit includes means for storing a plurality of codes, each of which is associated with the address of a respective data handling device with which data communications may be conducted via said communications link, and wherein said prescribed communication control signals include address signals representative of respective ones of said plurality of codes and a signal for causing said control unit to control said modulator/demodulator unit to establish a data communications channel, over said communications link, to a data handling device the address of which corresponds to one of said plurality of codes as established by a respective address signal coupled by said control switch means, whereby synchronous data communication signals from a data handling device coupled to said second port may be transmitted by said modulator/demodulator unit over said channel to said addressed data handling device.

5. An apparatus according to claim 1, wherein said communications link comprises a telephone communications link.

6. An apparatus according to claim 1, wherein said second communications port is coupled directly to said modulator/demodulator unit.

7. An apparatus according to claim 6, wherein said third communications port is coupled by way of said communications control unit to said modulator/demodulator unit.

8. An apparatus according to claim 3, wherein said apparatus further includes indicator means, coupled to said communications control unit, for visually displaying prescribed operational characteristics of said apparatus.

9. An apparatus according to claim 8, wherein said indicator means and said control switch means are provided as part of a common external housing of said apparatus.

10. An apparatus according to claim 4, wherein said second communications port is coupled directly to said modulator/demodulator unit.

11. An apparatus according to claim 10, wherein said third communications port is coupled by way of said communications control unit to said modulator/demodulator unit.

12. An apparatus according to claim 11, wherein said apparatus further includes indicator means, coupled to said communications control unit, for visually displaying prescribed operational characteristics of said apparatus.

13. An apparatus according to claim 12, wherein said communications link comprises a telephone communications link.

14. For use in a data communications network wherein messages originating from or intended for delivery to a data handling device are transmitted over a communications link, an apparatus for carrying out the transmission and reception of said messages comprising:
   a first data communications port adapted to be coupled to said communications link;
   a second communications port adapted to be coupled to a data handling device;
   a modulator/demodulator unit, coupled to said first and second data communications ports, for transmitting data communication signals that are coupled to said second port from a data handling device over said communications link via said first data communications port, and for receiving data communication signals that are received from said data communications link at said first data communications port and coupling said data communication signals to said second port for delivery to a data handling device coupled thereto; and
   a communications control unit, coupled to said modulator/demodulator unit, for controlling the transmission by said modulator/demodulator unit, via said first port to said communications link, of data communication signals that are coupled to said second port by a data handling device, and for controlling the delivery of data communication signals, received from said communications link at said first port by said modulator/demodulator unit, to a data handling device coupled to said second port and including means for storing a plurality of codes, each of which is associated with the address of a respective data handling device with which data communications may be conducted via said communications link; and
   control switch means, coupled to said control unit, for causing said control unit to control said modulator/demodulator unit to establish a data communications channel over said communications link to a data handling device, the address of which corresponds to one of said plurality of codes, whereby data communication signals from a data handling device coupled to said second port may be transmitted by said modulator/demodulator unit over said channel to said addressed data handling device.

15. An apparatus according to claim 14, wherein said data communication signals comprise synchronous digital communication signals.

16. An apparatus according to claim 14, wherein said second communications port is adapted to interface either synchronous or asynchronous data communication signals.

17. An apparatus according to claim 14, further including a third communications port adapted to be coupled to a further data handling device, and wherein said communications control unit is further coupled to said third port, and is adapted to control, via said first communications port to said communications link, the transmission by said modulator/demodulator unit, of data communications signals that are coupled to either of said second and third ports by a data handling device, and for controlling the delivery of data communication signals, received from said communications link at said first port by said modulator/demodulator unit, to a data handling device coupled to one of said second and third ports.

18. An apparatus according to claim 17, wherein said data communication signals comprise synchronous digital communication signals.

19. An apparatus according to claim 17, wherein said second and third communication ports are adapted to interface asynchronous data communication signals.

20. An apparatus according to claim 19, wherein said communications link comprises a telephone communications link.

21. An apparatus according to claim 17, wherein said second communications port is coupled directly to said modulator/demodulator unit 22. An apparatus according to claim 17, wherein said apparatus further includes indicator means, coupled to said communications control unit, for visually displaying prescribed operational characteristics of said apparatus.

23. An apparatus according to claim 1, wherein said communications control unit includes means for storing at least one code which is associated with the address of a respective data handling device with which data communications may be conducted via said communications link, and wherein said apparatus further includes control switch means, coupled to said control unit, for causing said control unit to control said modulator/demodulator unit to establish a data communications channel over said communications link to a data handling device, the address of which corresponds to a code contained with said at least one code, whereby synchronous data communication signals from a data handling device coupled to said second port may be transmitted by said modulator/demodulator unit over said channel to said addresses data handling device.

24. An apparatus according to claim 3, wherein said communications control unit includes means for storing at least one code which is associated with the address of a respective data handling device with which data communications may be conducted via said communications link, and wherein a prescribed communication control signal includes an address signal representative of a respective code and a signal for causing said control unit to control said modulator/demodulator unit to establish a data communications channel, over said communications link, to a data handling device the address of which corresponds to a code contained within said at least one code as established by a respective address signal coupled by said control switch means, whereby synchronous data communication signals from a data handling device coupled to said second port may be transmitted by said modulator/demodulator unit over said channel to said addressed data handling device.

25. An apparatus according to claim 1, wherein said modulator/demodulator unit is operable at a selected one of a plurality of different data signalling rates.

26. An apparatus according to claim 25, wherein said modulator/demodulator unit has the capability of handling multiple modulation and signalling formats.

27. An apparatus according to claim 1, wherein said modulator/demodulator unit has the capability of handling multiple modulation and signalling formats.

28. An apparatus according to claim 1, wherein said communications control unit includes means for storing data communication signals that are coupled to one of said data communication ports for application to said modulator/demodulator unit.

29. An apparatus according to claim 1, wherein said communications control unit includes means for examining data communication signals that are coupled to one of said data communications port for applications to said modulator/demodulator unit for controlling the operation of said modulator/demodulator unit in accordance with communication control command signals contained within said data communication signals.

30. An apparatus according to claim 28, wherein said communications control unit includes means for examining data communication signals stored by said storing means for the presence of communication control command signals therein, and controlling the operation of said modulator/demodulator unit in accordance with control command signals contained within said examined data communications.

31. For use in a data communications network wherein messages originating from or intended for delivery to a data handling device are transmitted over a commmnications link, an apparatus for carrying out the transmission and reception of said messages comprising:
a first data communications port adapted to be coupled to said communications link;
a second communications port adapted to be coupled to a data handling device;
a modulator/demodulator unit, coupled to said first and second data communications port, for transmitting data communication signals that are coupled to said second port from a data handling device over said communications link via said first data communicatons port, and for receiving data communication signals that are received from said data commmunications link at said first data communicatons port and coupling said data communication signals to said second port for delivery to a data handling device coupled thereto; and
a communications control unit, coupled to said modulator/demodulator unit, for controlling the transmission by said modulator/demodulator unit, via said first port to said communications link, of data communications signals that are coupled to said second port by a data handling device, and for controlling the delivery of data communication signals, received from said communications link at said first port by said modulator/demodulator unit, to a data handling device coupled to said second port and including means for storing at least one code which is associated with the address of a respective data handling device with which data communications may be conducted via said communications link and for examining data communication signals that are coupled to one of said data communications ports for application to said modulator/demodulator unit and controlling the operation of said modulator/demodulator unit in accordance with communication control command signals contained within said data communications signals; and
control switch means, coupled to said control unit, for causing said control unit to control said modulator/demodulator unit to establish a data communications channel over said communications link to a data handling device the address of which corresponds a code contained within said at least one code, whereby data communication signals from a data handling device coupled to said second port may be transmitted by said modulator/demodulator unit over said channel to said addressed data handling device.

32. An apparatus according to claim 31, wherein said communications control unit includes means for storing data communication signals that are coupled to one of said data communications ports for application to said modulator/demodulator unit and for examining data communication signals stored by said storing means for the presence of communication control command signals therein, and controlling the operation of said modulator/demodulator unit in accordance with control command signals contained within said examined data communication signals.

33. An apparatus according to claim 31, wherein said at least one code corresponds to a plurality of codes.

34. An apparatus according to claim 33, further including a third data communications port adapted to be coupled to a further data handling device, and wherein said communications control unit is further coupled to said third port, and is adapted to control, via said first communications port to said communications link, the transmission by said modulator/demodulator unit, of data communications signals that are coupled to either of said second and third ports by a data handling device, and for controlling the delivery of data communication signals, received from said communications link at said first port by said modulator/demodulator unit, to a data port handling device coupled to one of said second and third ports.

35. An apparatus according to claim 34, wherein each of said second and third data communications ports is capable of interfacing asynchronous data communication signals and said second data communications port is capable of interfacing synchronous data communications signals.

36. An apparatus according to claim 1, wherein said communications control unit includes read only memory means containing a stored communication program for controlling the operation of said apparatus and a battery-powered random access memory means for storing said at least one mode and operational control information for maintaining the operation of the apparatus in the event of a power outage.

37. An apparatus according to claim 14, wherein said communications control unit includes read only memory means containing a stored communication program for controlling the operation of said apparatus and a battery-powered random access memory means for storing said at least one code and operational control information for maintaining the operation of the apparatus in the event of a power outage.

38. An apparatus according to claim 31, wherein said communications control unit includes read only memory means containing a stored communication program for controlling the operation of said apparatus and a battery-powered random access memory means for storing said at least one code and operational control information for maintaining the operation of the apparatus in the event of a power outage.

* * * * *